(12) United States Patent
Hager et al.

(10) Patent No.: US 11,746,757 B2
(45) Date of Patent: Sep. 5, 2023

(54) NACELLE FOR A WIND TURBINE

(71) Applicant: Miba Gleitlager Austria GmbH, Laakirchen (AT)

(72) Inventors: Gunther Hager, Micheldorf (AT); Johannes Sebastian Hoelzl, Berg im Attergau (AT); Johannes Reisenberger, Ohlsdorf (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 318 days.

(21) Appl. No.: 17/295,244

(22) PCT Filed: Dec. 9, 2019

(86) PCT No.: PCT/AT2019/060426
§ 371 (c)(1),
(2) Date: May 19, 2021

(87) PCT Pub. No.: WO2020/118334
PCT Pub. Date: Jun. 18, 2020

(65) Prior Publication Data
US 2021/0396216 A1 Dec. 23, 2021

(30) Foreign Application Priority Data
Dec. 13, 2018 (AT) .............................. A 51114/2018

(51) Int. Cl.
*F16C 17/10* (2006.01)
*F16C 27/02* (2006.01)
(Continued)

(52) U.S. Cl.
CPC ............ *F03D 80/70* (2016.05); *F16C 17/105* (2013.01); *F16C 27/02* (2013.01); *F16C 35/02* (2013.01);
(Continued)

(58) Field of Classification Search
CPC .......... F16C 23/04; F16C 25/04; F16C 27/02; F16C 2360/31; F16C 35/02; F03D 80/70
See application file for complete search history.

(56) References Cited

U.S. PATENT DOCUMENTS

| 3,203,260 A | 8/1965 | Pierry et al. |
| 6,637,942 B2 | 10/2003 | Dourlens et al. |

(Continued)

FOREIGN PATENT DOCUMENTS

| AT | 509 625 B1 | 10/2011 |
| AT | 516029 A4 | 2/2016 |

(Continued)

OTHER PUBLICATIONS

International Search Report in PCT/AT2019/060420, dated Mar. 5, 2020.

(Continued)

*Primary Examiner* — Justin D Seabe
(74) *Attorney, Agent, or Firm* — Collard & Roe, P.C.

(57) ABSTRACT

A rotor bearing for bearing a rotor hub on a nacelle housing of a nacelle for a wind turbine has at least one inner ring element and at least one outer ring element, wherein at least one sliding bearing element is arranged between the inner ring element and the outer ring element, which sliding bearing element is fastened to the inner ring element or to the outer ring element. On the sliding bearing element, a sliding surface is formed, which cooperates with a counterface, which is coupled with that ring element, to which the sliding bearing element is not fastened. The counterface is designed to be resilient.

10 Claims, 5 Drawing Sheets

(51) Int. Cl.
  *F03D 80/70* (2016.01)
  *F16C 35/02* (2006.01)
(52) U.S. Cl.
  CPC ....... *F05B 2240/52* (2013.01); *F16C 2300/14* (2013.01); *F16C 2360/31* (2013.01)

(56) References Cited

U.S. PATENT DOCUMENTS

| | | |
|---|---|---|
| 6,866,423 B2 | 3/2005 | Faltus et al. |
| 7,794,151 B2 | 9/2010 | Neumann |
| 7,832,980 B2 | 11/2010 | Demtroder et al. |
| 8,545,186 B2 | 10/2013 | Loeschner et al. |
| 8,591,371 B2 | 11/2013 | Dinter et al. |
| 8,840,521 B2 | 9/2014 | Kari et al. |
| 8,974,120 B2 | 3/2015 | Pedersen et al. |
| 9,057,365 B2 | 6/2015 | Han et al. |
| 9,206,787 B2 | 12/2015 | Winkelmann |
| 9,279,413 B2 | 3/2016 | Ebbesen et al. |
| 9,297,454 B2 | 3/2016 | Barthel et al. |
| 9,435,376 B2 | 9/2016 | Gaertner et al. |
| 9,458,880 B2 | 10/2016 | Kari et al. |
| 9,657,716 B2 | 5/2017 | Vervoorn et al. |
| 9,677,606 B2 | 6/2017 | Pischel |
| 9,683,602 B2 | 6/2017 | Hager et al. |
| 9,784,245 B2 | 10/2017 | Hager et al. |
| 9,845,826 B2 | 12/2017 | Sutton et al. |
| 9,869,349 B2 | 1/2018 | Rittmann et al. |
| 9,995,283 B2 | 6/2018 | Stiesdal |
| 10,072,704 B2 * | 9/2018 | Sato ............... F03D 80/70 |
| 10,288,164 B2 | 5/2019 | Hoelzl |
| 10,436,249 B2 | 10/2019 | Hoelzl |
| 10,502,259 B2 | 12/2019 | Meyer |
| 10,598,214 B2 | 3/2020 | Hoelzl |
| 10,612,586 B2 * | 4/2020 | Frydendal ............... F16C 17/06 |
| 10,724,624 B2 | 7/2020 | Tulokas |
| 11,009,077 B2 | 5/2021 | Hofmann et al. |
| 11,280,320 B2 | 3/2022 | Claramunt Estecha et al. |
| 11,384,728 B2 | 7/2022 | Elmose |
| 2002/0114549 A1 | 8/2002 | Hokkirigawa et al. |
| 2003/0063821 A1 | 4/2003 | Dourlens et al. |
| 2010/0111459 A1 | 5/2010 | Yasuda |
| 2011/0254281 A1 * | 10/2011 | Noda .................. F16C 25/04 290/55 |
| 2013/0071246 A1 | 3/2013 | Kari et al. |
| 2014/0161614 A1 | 6/2014 | Vervoorn et al. |
| 2014/0193262 A1 | 7/2014 | Pedersen et al. |
| 2014/0193264 A1 | 7/2014 | Pedersen et al. |
| 2014/0377063 A1 * | 12/2014 | Guerenbourg .......... F03D 80/70 384/291 |
| 2015/0017000 A1 | 1/2015 | Sato et al. |
| 2015/0159693 A1 | 6/2015 | Corts |
| 2015/0369284 A1 | 12/2015 | Hager et al. |
| 2016/0076522 A1 | 3/2016 | Rohden |
| 2020/0158090 A1 | 5/2020 | Hager et al. |
| 2020/0173425 A1 * | 6/2020 | Schroeder ............... F16C 17/10 |

FOREIGN PATENT DOCUMENTS

| | | |
|---|---|---|
| AT | 519288 A1 | 5/2018 |
| AT | 15975 U1 | 10/2018 |
| AU | 650057 B2 | 3/1992 |
| AU | 2008331343 A1 | 2/2010 |
| CN | 101438068 A | 5/2009 |
| CN | 101965455 A | 2/2011 |
| CN | 102009663 A | 4/2011 |
| CN | 202082374 U | 12/2011 |
| CN | 102345676 A | 2/2012 |
| CN | 102418833 A | 4/2012 |
| CN | 102713276 A | 10/2012 |
| CN | 103557124 A | 2/2014 |
| CN | 103765005 A | 4/2014 |
| CN | 104234949 A | 12/2014 |
| CN | 104819209 A | 8/2015 |
| CN | 104956101 A | 9/2015 |
| CN | 204627877 U | 9/2015 |
| CN | 106062391 A | 10/2016 |
| CN | 106164509 A | 11/2016 |
| CN | 106884972 A | 6/2017 |
| CN | 108167442 A1 | 6/2018 |
| CN | 108884863 A | 11/2018 |
| DE | 37 02 008 A1 | 8/1988 |
| DE | 3726751 A1 | 2/1989 |
| DE | 10064261 A1 | 7/2002 |
| DE | 10 2005 001 344 A1 | 7/2006 |
| DE | 10 2005 018 836 B3 | 12/2006 |
| DE | 60219261 T2 | 1/2008 |
| DE | 10 2011 119 471 A1 | 5/2013 |
| DE | 10 2012 212 792 A1 | 1/2014 |
| DE | 10 2013 211 710 B3 | 10/2014 |
| DE | 10 2014 205 637 A1 | 10/2015 |
| DE | 10 2015 201 356 A1 | 7/2016 |
| DE | 11 2013 003 034 B4 | 8/2017 |
| EP | 1 564 406 A1 | 8/2005 |
| EP | 2 003 334 A1 | 12/2008 |
| EP | 2 136 093 A1 | 12/2009 |
| EP | 2290269 A1 | 3/2011 |
| EP | 2 383 480 B1 | 10/2012 |
| EP | 2 568 163 A1 | 3/2013 |
| EP | 2 597 307 A2 | 5/2013 |
| EP | 2 600 037 A1 | 6/2013 |
| EP | 2 657 519 A1 | 10/2013 |
| EP | 2 679 492 A1 | 1/2014 |
| EP | 2 711 568 A1 | 3/2014 |
| EP | 2816226 A1 | 12/2014 |
| EP | 2 863 076 A1 | 4/2015 |
| EP | 2 955 413 A1 | 12/2015 |
| EP | 3 012 479 A1 | 4/2016 |
| EP | 3 040 553 A1 | 7/2016 |
| EP | 3 139 034 A1 | 3/2017 |
| EP | 3 173 642 A1 | 5/2017 |
| EP | 3 252 306 A1 | 6/2017 |
| EP | 3 279 471 A1 | 2/2018 |
| EP | 3 343 071 A1 | 7/2018 |
| EP | 3 396 187 A1 | 10/2018 |
| GB | 2 201 200 B | 8/1990 |
| JP | S59-54812 A | 3/1984 |
| JP | H04-203566 A | 7/1992 |
| JP | H07-3248 B2 | 1/1995 |
| JP | H07-293556 A | 11/1995 |
| JP | H11-303857 A | 11/1999 |
| JP | 2002-195261 A1 | 7/2002 |
| JP | 2003176822 A | 6/2003 |
| JP | 2003194071 A | 7/2003 |
| JP | 2006-118552 A | 5/2006 |
| JP | 2010-101263 A | 5/2010 |
| JP | 2010151207 A | 7/2010 |
| JP | 2015-001279 A | 1/2015 |
| JP | 2017-048849 A | 3/2017 |
| KR | 2014-0143620 A | 12/2014 |
| WO | 2007/071239 A1 | 6/2007 |
| WO | 2011/127509 A1 | 10/2011 |
| WO | 2011/127510 A1 | 10/2011 |
| WO | 2013/191163 A1 | 12/2013 |
| WO | 2014/005587 A1 | 1/2014 |
| WO | 2014/117196 A1 | 8/2014 |
| WO | 2014/173808 A1 | 10/2014 |
| WO | 2018/071941 A1 | 4/2018 |

OTHER PUBLICATIONS

International Search Report in PCT/AT2019/060424, dated Apr. 3, 2020.
International Search Report in PCT/AT2019/060425, dated Apr. 14, 2020.
International Search Report in PCT/AT2019/060421, dated Apr. 3, 2020.
International Search Report in PCT/AT2019/060426, dated Apr. 7, 2020.
International Search Report in PCT/AT2019/060419, dated Mar. 26, 2020.

(56) References Cited

OTHER PUBLICATIONS

Li Yunlong, Discussion on Localization of Composite Material Sliding Bearing in Hydropower Projects, Hongshui River, vol. 35, Issue 2, 4 pages, with English Abstract at the end of the document, Apr. 2016.

* cited by examiner

NACELLE FOR A WIND TURBINE

CROSS REFERENCE TO RELATED APPLICATIONS

This application is the National Stage of PCT/AT2019/060426 filed on Dec. 9, 2019 which claims priority under 35 U.S.C. § 119 of Austrian Application No. A 51114/2018 filed on Dec. 13, 2018, the disclosure of which is incorporated by reference. The international application under PCT article 21 (2) was not published in English.

The invention relates to a rotor bearing for bearing a rotor hub on a nacelle housing of a nacelle for a wind turbine.

A variety of rotor bearings are known from the prior art. A rotor bearing is known from AT509625B1, for example. In these known rotor bearings, the problem occurs that, in case of a tilting of the inner ring element relative to the outer ring element, which tilting occurs because of a tilting torque acting on the rotor bearing, a local overstraining of the sliding bearing elements occurs. This can lead to an increase in wear and/or consequently to a decreased lifespan of the sliding bearing elements.

The object of the present invention was to overcome the disadvantages of the prior art and to provide a rotor bearing having an increased lifespan.

This object is achieved by means of a device and a method according to the claims.

According to the invention, a rotor bearing for bearing a rotor hub on a nacelle housing of a nacelle for a wind turbine is provided. The rotor bearing has at least one inner ring element and at least one outer ring element, wherein at least one sliding bearing element is arranged between the inner ring element and the outer ring element, which sliding bearing element is fastened to the inner ring element or to the outer ring element. On the sliding bearing element, a sliding surface is formed, which cooperates with a counterface, which is coupled with that ring element, to which the sliding bearing element is not fastened. The counterface is designed to be resilient.

The rotor bearing according to the invention has the advantage that the counterface can adapt to the sliding surface of the sliding bearing element. By this, it can be achieved that the sliding surface of the sliding bearing element rests on the counterface over its entire surface, whereby a local overstraining of the sliding bearing element can be avoided. In particular, the lifespan of the sliding bearing element can be increased by this. The counterface being designed to be resilient means in particular that the counterface can flexibly adapt to the sliding surface of the sliding bearing element. In particular, it may be provided that the resilience of the counterface exceeds the material-induced slight elastic resilience of conventional arrangements, as described in AT509625B1, wherein in particular tapered, springy cross-sections or corresponding hinged connections are provided for achieving the resilience.

Moreover, it may be useful if the counterface is coupled with a spring element, which is fastened to that ring element, to which the sliding bearing element is not fastened. By coupling the counterface to the spring element, it can be achieved that the resilience of the counterface is ensured by elastic material deformations in the spring element. In such an embodiment variant, no separate hinged connections are necessary.

Furthermore, it may be provided that a section of that ring element, on which the counterface is formed, has a resilient region. In this regard, it may be provided that the counterface is formed directly on the ring element, wherein the flexibility of the counterface can be achieved by means of the resilient region. For example, it may be provided that the counterface is formed on a wing-like element of the ring element, wherein the wing-like element is elastically coupled, in the region of a connection with a main body, with the main body. The wing-like element may also be referred to as flank.

In addition to this, it may be provided that both the inner ring element and the outer ring element are designed to be V-shaped, and a first sliding bearing element and a second sliding bearing element are formed to be axially spaced apart from each other, which sliding bearing elements are arranged between the ring elements, wherein on that ring element, on which the counterface is arranged, a first flank and a second flank is formed, wherein on each of the two flanks, one of the counterfaces is formed, wherein the flanks are each designed to be elastically resilient.

A design according to which it may be provided that the counterface is resiliently coupled with the ring element by means of a joint is also advantageous. Particularly by this measure, the flexibility of the counterface can be increased. For example, it may be provided that the counterface is formed on a thin metal strip, wherein on the opposite side of the counterface of the metal strip, the metal strip is coupled with the ring element in a hinged manner According to an advancement, it is possible that the counterface is arranged on a flexible structure, so that the counterface is designed to be resilient in itself. This constitutes an alternative variant to that embodiment in which the counterface is designed to be resilient in its entirety.

Furthermore, it may be useful if the flexible structure comprises a layer which has a layer thickness of between 0.1 mm and 15 mm, in particular between 1 mm and 10 mm, preferably between 2 mm and 4 mm, wherein the counterface is formed on the layer, wherein a support cushion is formed under the layer. By this measure, a flexible structure of the counterface can be achieved, by which flexible structure an excessive strain on the sliding bearing can be prevented.

In addition to this, it may be provided that the support cushion comprises a viscous material. Particularly a support cushion formed in such a manner can absorb and/or distribute the occurring pressure forces well, so that the counterface can adapt to the sliding surface, and a uniform surface pressure on the counterface and/or on the sliding surface can be achieved.

Moreover, it may be provided that the first flank and/or the second flank are designed to be segmented across the circumference and that they each have multiple flank segments.

Moreover, it may be provided that the spring element is designed to be segmented across the circumference and that it has multiple spring element segments.

According to the invention, a nacelle for a wind turbine is provided. The nacelle comprises:
- a nacelle housing;
- a rotor hub;
- a rotor bearing for bearing the rotor hub on the nacelle housing. The rotor bearing is formed according to the above measures.

Moreover, a wind turbine having a nacelle is provided according to the invention. The nacelle comprises:
- a nacelle housing;
- a rotor hub with rotor blades arranged thereon;
- a rotor bearing for bearing the rotor hub on the nacelle housing. The rotor bearing is formed according to one of the preceding claims.

In addition to a nacelle housing, a nacelle within the meaning of this document also comprises a rotor hub and a rotor bearing for bearing the rotor hub.

The inner ring element and/or the outer ring element can each be formed as independent components, which may be coupled with the rotor hub or rotor shaft and/or with the nacelle housing. In the alternative to this, it is also conceivable that the inner ring element is formed as an integral element of the rotor hub and/or the rotor shaft. In the alternative to this, it is also conceivable that the outer ring element is formed as an integral element of the rotor hub and/or the rotor shaft. In the alternative to this, it is also conceivable that the inner ring element is formed as an integral element of the nacelle housing. In the alternative to this, it is also conceivable that the outer ring element is formed as an integral element of the nacelle housing.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
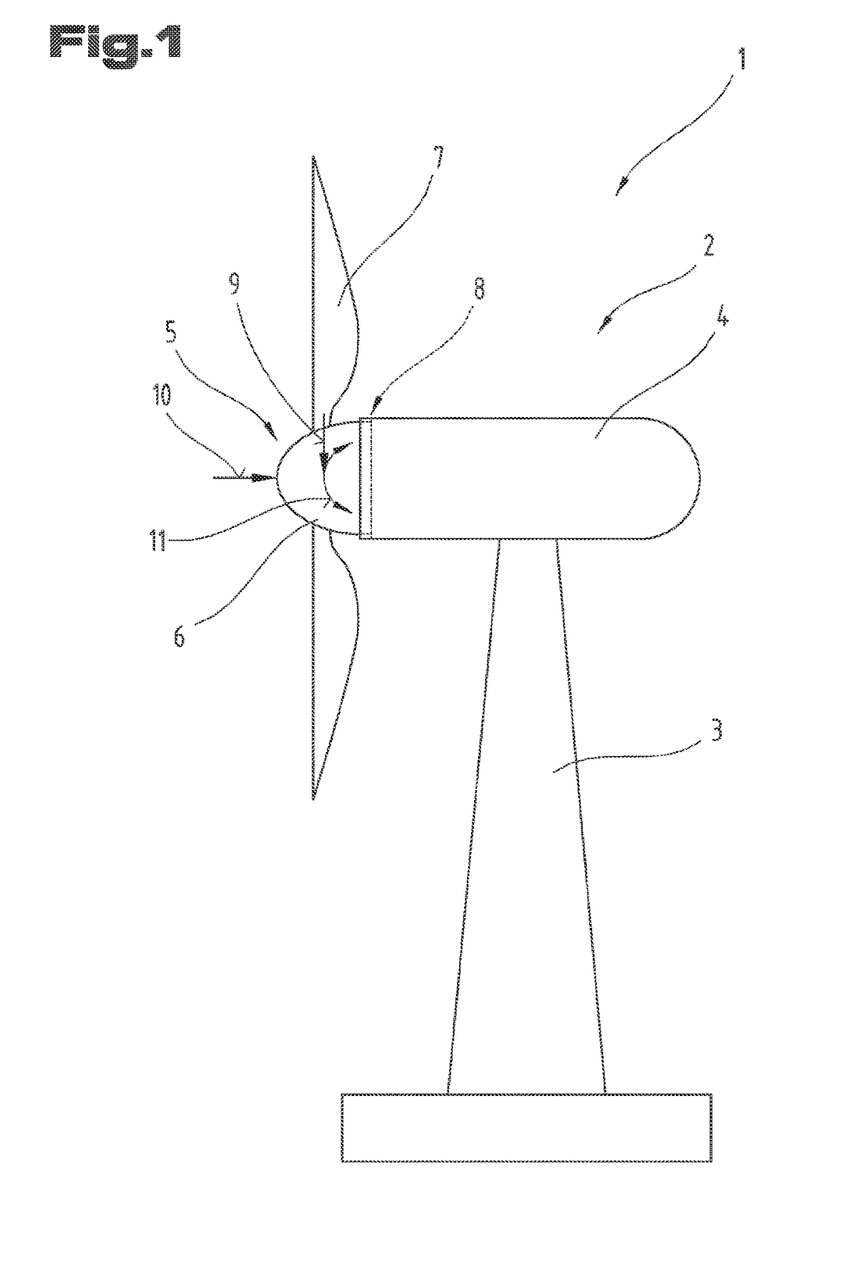
FIG. 1 a schematic representation of a wind turbine.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger.

Figure 2:
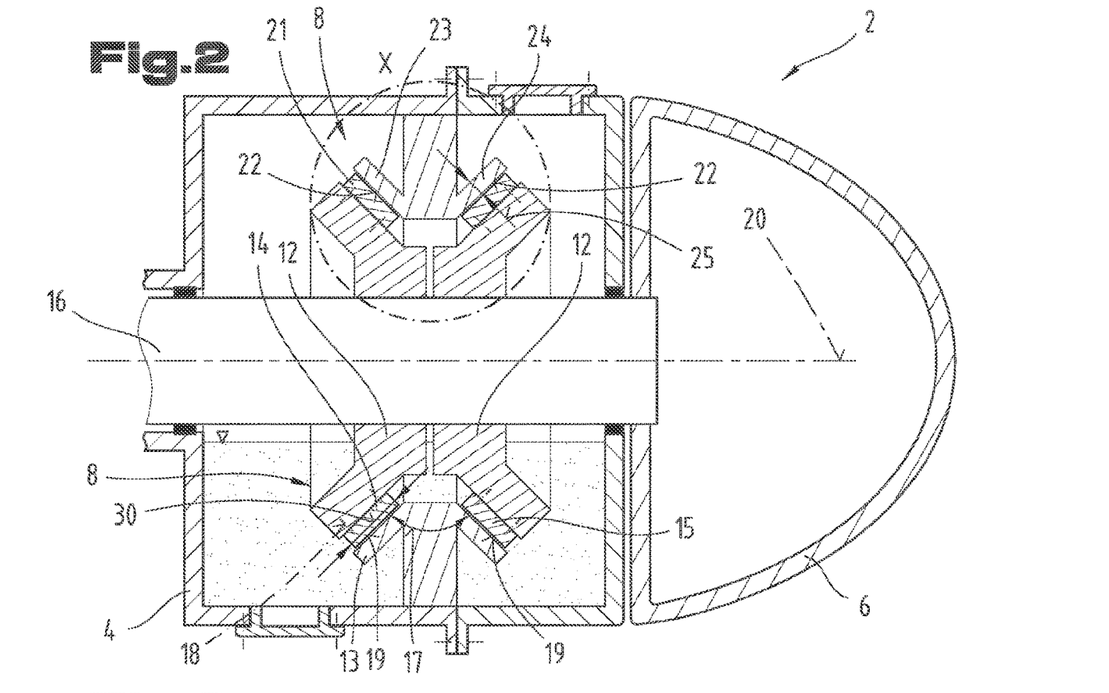
FIG. 2 a cross-section of a nacelle in a very schematic representation.

FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14, 15 is arranged between the inner ring element 12 and the outer ring element 13. In particular, it may be provided that a first sliding bearing element 14 and a second sliding bearing element 15 is arranged between the inner ring element 12 and the outer ring element 13.

As can be seen from FIG. 2, it may be provided that the inner ring element 12 is coupled with the rotor hub 6. In particular, it may be provided that a rotor shaft 16 is formed, on which the rotor hub 6 is arranged. The inner ring element 12 can be received directly on the rotor shaft 16.

In a further exemplary embodiment that is not depicted, it may of course also be provided that the inner ring element 12 is received directly on the rotor hub 6.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14, 15 are each formed so as to be spaced apart from each other on the V-shaped flank between the two ring elements 12, 13. In particular, it may be provided that the two sliding bearing elements 14, 15 are arranged at an angle 17 to one another.

As can be seen from FIG. 2, an exemplary embodiment may provide that the sliding bearing elements 14 are fastened to the inner ring element 12 by means of a fastening means 18. Hence, a sliding surface 19 may be formed between the sliding bearing elements 14, 15 and the outer ring element 13. In an arrangement of the sliding bearing elements 14, 15 as it is shown in FIG. 2, the sliding surfaces 19 may also be arranged in a V-shape.

In an embodiment variant that is not depicted, it may also be provided that the sliding bearing element 14, 15 is formed between the two ring elements 12, 13 as a radial bearing and/or as an axial bearing.

As can also be seen from FIG. 2, it may be provided that the inner ring element 12 is designed to be parted with regard to its axial extension, in order to make the assembly of the rotor bearing 8 easier.

In an exemplary embodiment that is not depicted, it is of course also conceivable that the inner ring element 12 does not form a groove as shown in the exemplary embodiment of FIG. 2, but rather that the V-shaped arrangement has a reverse formation, so that a V-shaped projection is formed on the inner ring element 12. In this case, it may be provided for the purpose of an easier assembly that the outer ring element 13 is designed to be parted in its axial extension.

In particular, it may be provided that the sliding bearing elements 14, 15 are arranged about a rotor axis 20.

Moreover, it may be provided that the sliding bearing element 14, 15 comprises multiple sliding bearing pads 21 which are arranged so as to be distributed across the circumference. The individual sliding bearing pads 21 can be coupled with and/or fastened on the inner ring element 12 by means of the fastening means 18. In particular, it may be provided that the individual sliding bearing pads 21 are independently releasable from the inner ring element 12 by means of the fastening means 18. Thereby, the individual sliding bearing pads 21 can be removed from their operating position and/or be replaced individually and independently of each other.

As can further be seen from FIG. 2, a counterface 22 is formed on the outer ring element 13, which counterface 22 cooperates with the sliding surface 19. Moreover, it can be seen in the present exemplary embodiment that it may be provided that a first flank 23 and a second flank 24 are formed on the outer ring element 13, on which the counterface 22 is arranged in each case. In particular, it may be provided that by means of the first flank 23 and by means of the second flank 24, the V-shaped structure of the outer ring element 13 is realized.

Moreover, it may be provided that a wall thickness 25 of the flanks 23, 24 is selected to be so small that the flanks 23, 24 are designed to be elastically resilient.

Figure 3:
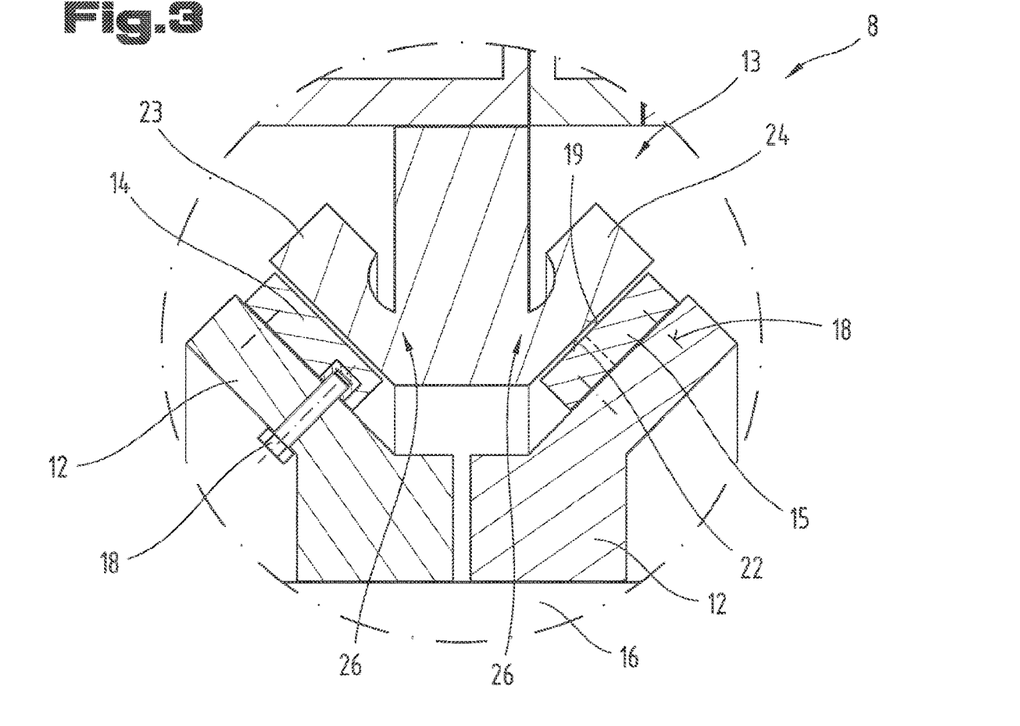
FIG. 3 a second exemplary embodiment of the rotor bearing in a detail view X of FIG. 2.

FIG. 3 shows, in a detail view X of FIG. 2, a further and possibly independent embodiment of the rotor bearing 8, wherein again, equal reference numbers and/or component designations are used for equal parts as in FIGS. 1 through 2 above. In order to avoid unnecessary repetitions, it is pointed to/reference is made to the detailed description in FIGS. 1 through 2 preceding it.

As can be seen from FIG. 3, it may be provided that a section of the outer ring element 13, in particular a section of the flanks 23, 24, has a resilient region 26, which is formed such that the flanks 23, 24 as a whole are designed to be resilient. The resilient regions 26 may, for example, be formed by tapers in the cross-section of the flanks 23, 24.

Figure 4:
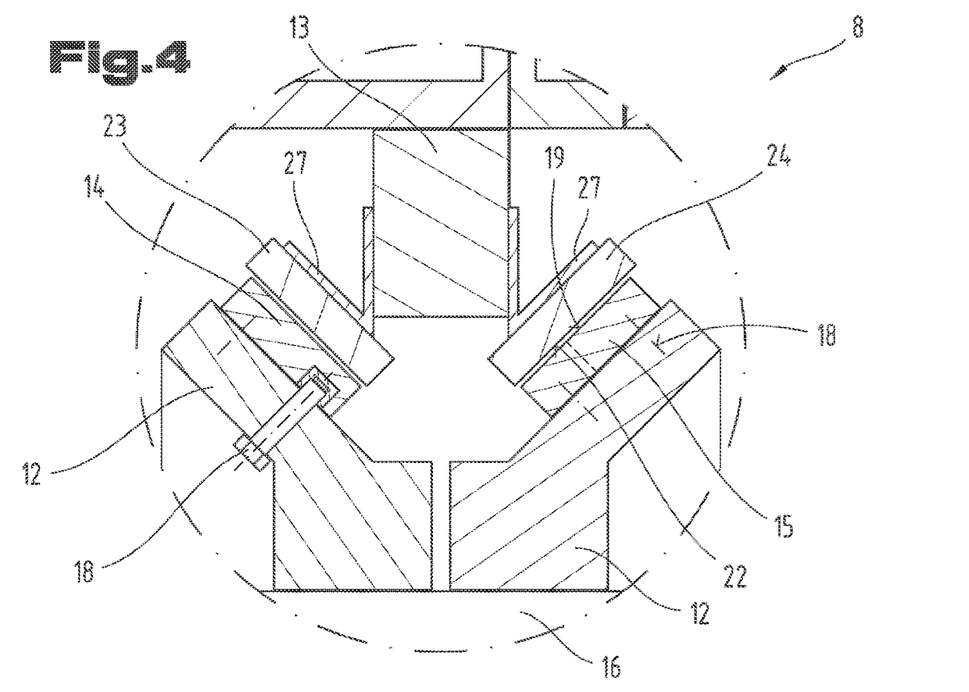
FIG. 4 a third exemplary embodiment of the rotor bearing in a detail view X of FIG. 2.

FIG. 4 shows, in a detail view X of FIG. 2, a further and possibly independent embodiment of the rotor bearing 8, wherein again, equal reference numbers and/or component designations are used for equal parts as in FIGS. 1 through 3 above. In order to avoid unnecessary repetitions, it is pointed to/reference is made to the detailed description in FIGS. 1 through 3 preceding it.

As can be seen from FIG. 4, it may be provided that the two flanks 23, 24, on which the counterfaces 22 are formed, are designed in the form of independent components, which are coupled with the outer ring element 13 by means of a spring element 27. By means of the spring elements 27, a flexible connection of the flanks 23, 24 to the outer ring element 13 can be established. In particular, it may be provided that in such an exemplary embodiment, the first flank 23 and/or the second flank 24 is designed to be segmented across the circumference and that they each have multiple flank segments. Analogously thereto, it may be provided that the spring element 27 is also designed to be segmented across the circumference and that it has multiple spring element segments. In particular, it may be provided that a pitch of the flank segments and the spring element segments is selected to be equal, so that one flank segment is received per spring element segment.

Figure 5:
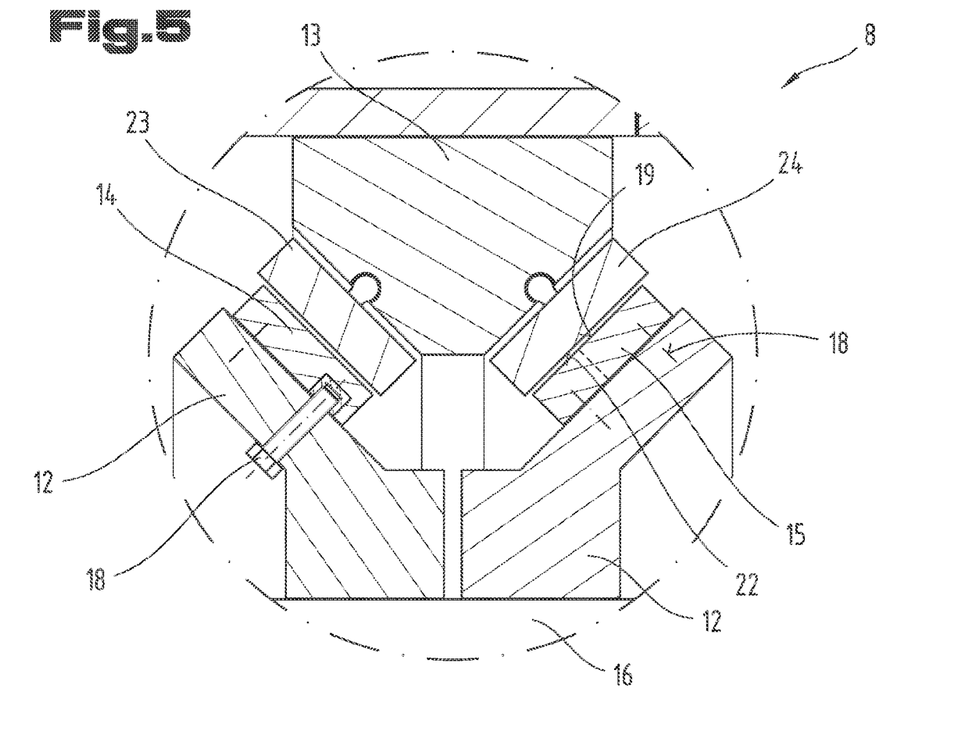
FIG. 5 a fourth exemplary embodiment of the rotor bearing in a detail view X of FIG. 2.

FIG. 5 shows, in a detail view X of FIG. 2, a further and possibly independent embodiment of the rotor bearing 8, wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

As can be seen from FIG. 5, it may be provided that the first flank 23 and/or the second flank 24 are each coupled with the outer ring element 13 by means of a joint 28 and thereby, the resilience of the counterfaces 22 can be achieved. In this regard, the flanks 23, 24 may also be designed to be segmented.

Figure 6:
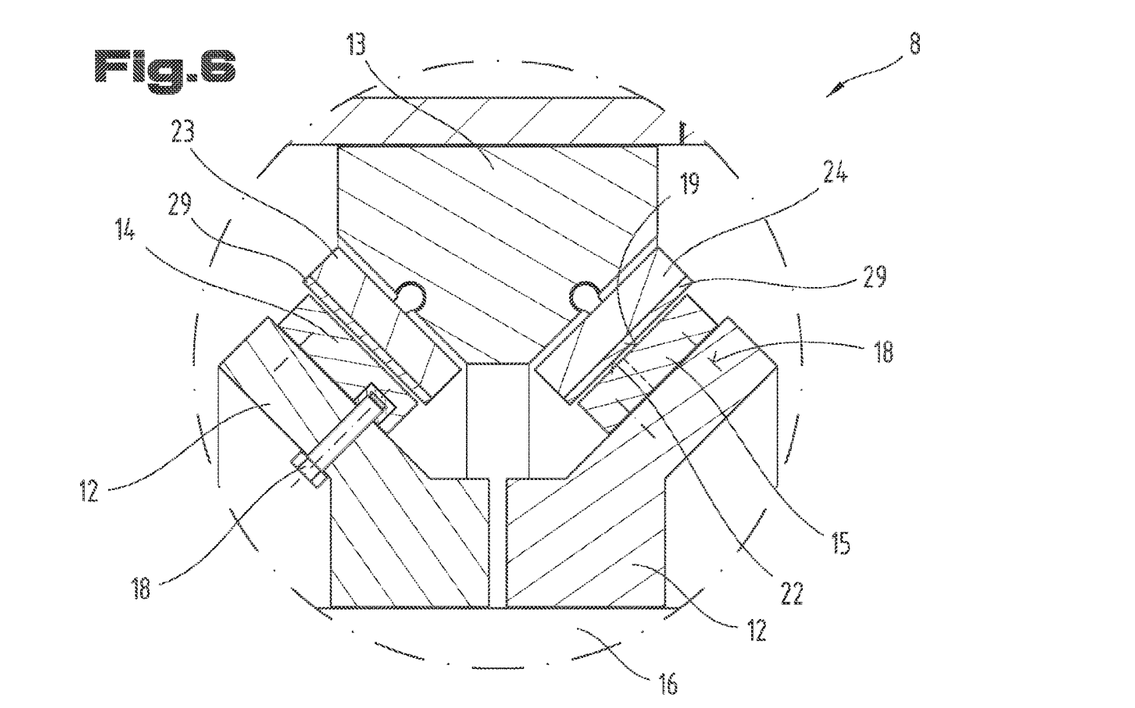
FIG. 6 a fifth exemplary embodiment of the rotor bearing in a detail view X of FIG. 2.

FIG. 6 shows, in a detail view X of FIG. 2, a further and possibly independent embodiment of the rotor bearing 8, wherein again, equal reference numbers and/or component designations are used for equal parts as in FIGS. 1 through 5 above. In order to avoid unnecessary repetitions, it is pointed to/reference is made to the detailed description in FIGS. 1 through 5 preceding it.

FIG. 6 shows a further exemplary embodiment of the rotor bearing 8. As can be seen from FIG. 6, it may be provided that in a segmented embodiment of the flanks 23, 24, in each case one circumferential support element 29 is provided, on which the counterface 22 is formed. The circumferential support element 29 entails the advantage that a continuous surface of the counterface 22 can be achieved, whereby the wear of the sliding bearing elements 14, 15 can be reduced. Such a support element 29 may of course be used in all embodiment variants in which segmented flanks 23, 24 are provided.

Figure 7:
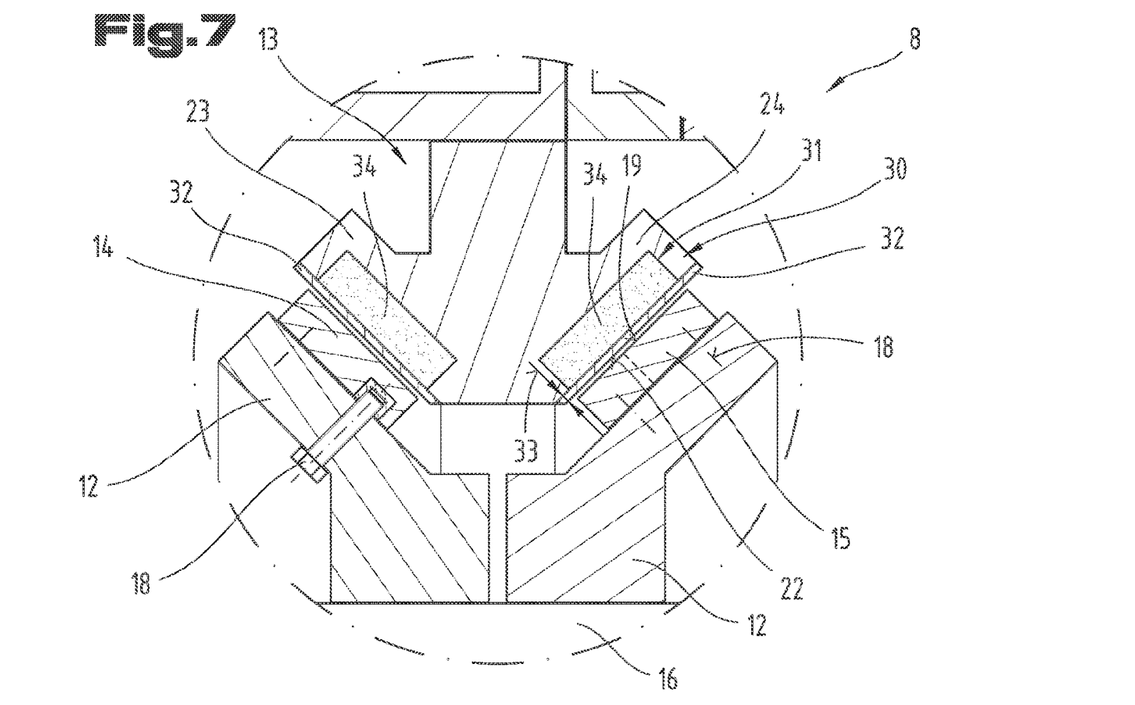
FIG. 7 a sixth exemplary embodiment of the rotor bearing in a detail view X of FIG. 2.

FIG. 7 shows, in a detail view X of FIG. 2, a further and possibly independent embodiment of the rotor bearing 8, wherein again, equal reference numbers and/or component designations are used for equal parts as in FIGS. 1 through 6 above. In order to avoid unnecessary repetitions, it is pointed to/reference is made to the detailed description in FIGS. 1 through 6 preceding it.

As can be seen from FIG. 7, it may be provided that a flexible structure 30 is formed directly in the outer ring element 13, by means of which flexible structure 30 the counterface 22 can be designed to be resilient in itself. In particular, it may be provided that in the first flank 23 and/or in the second flank 24, a cavity 31 is formed, which is covered by a layer 32 on which the counterface 22 is formed. In this regard, a layer thickness 33 of the layer 32 can be selected to be so small that the layer 32 is designed to be deformable in itself. In order to be able to support the layer 32, it may be provided that a support cushion 34 is arranged in the cavity 31, by means of which support cushion 34 the pressure force acting on the layer 32 can be distributed evenly. The support cushion 34 may for example be formed by and/or comprise a gel and/or a fluid.

Figure 8:
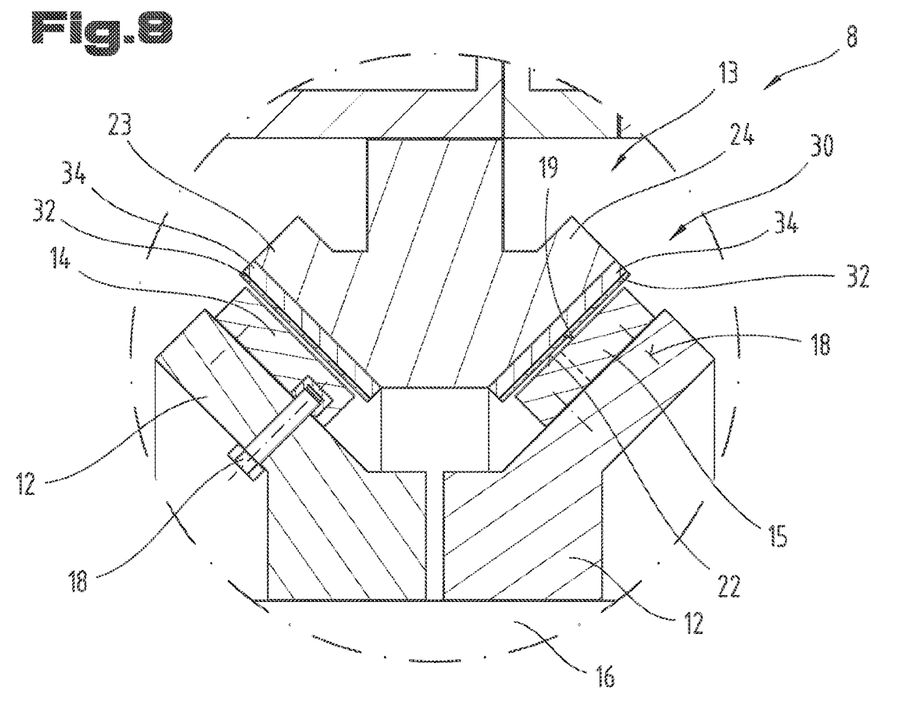
FIG. 8 a seventh exemplary embodiment of the rotor bearing in a detail view X of FIG. 2.

FIG. 8 shows, in a detail view X of FIG. 2, a further and possibly independent embodiment of the rotor bearing 8, wherein again, equal reference numbers and/or component designations are used for equal parts as in FIGS. 1 through 7 above. In order to avoid unnecessary repetitions, it is pointed to/reference is made to the detailed description in FIGS. 1 through 7 preceding it.

As can be seen from FIG. 8, it may be provided that the support cushion 34 is arranged directly on the first flank 23 and/or on the second flank 24, and that the layer 32 is arranged and/or formed on the support cushion 34. In such an exemplary embodiment, the layer 32 may be formed by a flexible material such as rubber. The layer 32 may for example be designed in the form of a metal, which is arranged on the support cushion 34.

As an alternative thereto, it may also be provided that the layer 32 is formed by another type of material, which is applied to the support cushion 34. For example, it may be provided that the layer 32 is designed in the form of an anti-friction varnish, which is applied to the support cushion 34. In this regard, it may be provided in particular that the material of the layer 32 is designed to be deformable.

In the exemplary embodiments from FIGS. 2 to 8, the counterface 22 is arranged on the outer ring element 13, and the sliding surface 19 is arranged on the inner ring element 12. Analogously to these individual embodiment variants, it may of course also be provided that the counterface 22 is arranged on the inner ring element 12, and the sliding surface 19 is arranged on the outer ring element 13. It lies within the capabilities of a person skilled in the art to derive the correspondingly reversed situation between the inner ring element 12 and the outer ring element 13 from the depicted exemplary embodiments.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| 1 | wind turbine |
|---|---|
| 2 | nacelle |
| 3 | tower |
| 4 | nacelle housing |
| 5 | rotor |
| 6 | rotor hub |
| 7 | rotor blade |
| 8 | rotor bearing |
| 9 | radial force |
| 10 | axial force |
| 11 | tilting torque |
| 12 | inner ring element |
| 13 | outer ring element |
| 14 | first sliding bearing element |
| 15 | second sliding bearing element |
| 16 | rotor shaft |
| 17 | angle |
| 18 | fastening means |
| 19 | sliding surface |
| 20 | rotor axis |
| 21 | sliding bearing pad |
| 22 | counterface |
| 23 | first flank |
| 24 | second flank |
| 25 | wall thickness of the flank |
| 26 | resilient region |
| 27 | spring element |
| 28 | joint |
| 29 | support element |
| 30 | flexible structure |
| 31 | cavity |
| 32 | layer |
| 33 | layer thickness |
| 34 | support cushion |

The invention claimed is:

1. A rotor bearing (8) for bearing a rotor hub (6) on a nacelle housing (4) of a nacelle (2) for a wind turbine (1), wherein the rotor bearing (8) has at least one inner ring element (12) and at least one outer ring element (13), wherein at least one sliding bearing element (14, 15) is arranged between the inner ring element (12) and the outer ring element (13), which sliding bearing element (14, 15) is fastened to the inner ring element (12) or to the outer ring element (13), wherein a sliding surface (19) is formed on the sliding bearing element (14, 15), which sliding bearing element (19) cooperates with a counterface (22), which is coupled with that ring element (12, 13) to which the sliding bearing element (14, 15) is not fastened, wherein the counterface (22) is designed to be resilient.

2. The rotor bearing (8) according to claim 1, wherein the counter-face (22) is coupled with a spring element (27), which is fastened to that ring element (12, 13), to which the sliding bearing element (14, 15) is not fastened.

3. The rotor bearing (8) according to claim 1, wherein a section of that ring element (12, 13), on which the counterface (22) is formed, has a resilient region (26).

4. The rotor bearing (8) according to claim 3, wherein both the inner ring element (12) and the outer ring element (13) are designed to be V-shaped, and a first sliding bearing element (14) and a second sliding bearing element (15) are formed to be axially spaced apart from each other, which sliding bearing elements (14, 15) are arranged between the ring elements (12, 13), wherein on that ring element (12, 13), on which the counterface (22) is arranged, a first flank (23) and a second flank (24) is formed, wherein on each of the two flanks (23, 24), one of the counterfaces (22) is formed, wherein the flanks (23, 24) are each designed to be elastically resilient.

5. The rotor bearing (8) according to claim 1, wherein the counterface (22) is resiliently coupled with the ring element (12, 13) by means of a joint (28).

6. The rotor bearing (8) according to claim 1, wherein the counterface (22) is arranged on a flexible structure (30), so that the counterface (22) is designed to be resilient in itself.

7. The rotor bearing (8) according to claim 6, wherein the flexible structure (30) comprises a layer (32) which has a layer thickness (33) of between 0.1 mm and 15 mm, wherein the counterface (22) is formed on the layer (32), wherein a support cushion (34) is formed under the layer (32).

8. The rotor bearing (8) according to claim 7, wherein the support cushion (34) comprises a viscous material.

9. A nacelle (2) for a wind turbine (1), the nacelle (2) comprising:

a nacelle housing (4);

a rotor hub (6);

a rotor bearing (8) for bearing the rotor hub (6) on the nacelle housing (4), wherein the rotor bearing (8) is formed according to claim 1.

10. A wind turbine (1) having a nacelle (2), the nacelle (2) comprising:
- a nacelle housing (4);
- a rotor hub (6) with rotor blades arranged thereon;
- a rotor bearing (8) for bearing the rotor hub (6) on the nacelle housing (4), wherein the rotor bearing (8) is formed according to claim 1.

\* \* \* \* \*